United States Patent [19]
Shimizu

[11] 3,889,936
[45] June 17, 1975

[54] COMBINED AIR MOUNTS

[75] Inventor: Kazuya Shimizu, Tokyo, Japan

[73] Assignee: Barry Wright Corporation, Watertown, Mass.

[22] Filed: Apr. 12, 1974

[21] Appl. No.: 460,343

[52] U.S. Cl............................ 267.65 R; 105/197 B
[51] Int. Cl................................................ F16f 5/00
[58] Field of Search .... 267/65 A, 65 B, 65 R, 64 R; 105/197 B

[56] References Cited
UNITED STATES PATENTS

| | | | |
|---|---|---|---|
| 2,773,686 | 12/1956 | Nash | 105/197 B |
| 2,902,291 | 9/1959 | Walker | 267/65 A |
| 3,190,237 | 6/1965 | Hurtner | 105/197 B |

Primary Examiner—James B. Marbert
Attorney, Agent, or Firm—Milton E. Gilbert

[57] ABSTRACT

A new pneumatic mounting assembly comprising two cooperative pneumatic spring systems. One system primarily serves as a load support while the other system primarily serves as a vibration and shock damper or isolator.

15 Claims, 3 Drawing Figures

COMBINED AIR MOUNTS

This invention pertains to resilient mountings and supports for fixed or mobile equipment and more particularly to pneumatic springs for use as load supports and shock and vibration isolators.

Resilient supports for fixed and mobile machinery are known which comprise elastomeric members that are pressurized to form a pneumatic spring. Such devices are exemplified in U.S. Pat. Nos. 3,020,856 and 3,160,407 and other references cited in said patents.

The present invention is concerned with improving over prior systems for mounting equipment by means of pneumatic mounts.

A primary object of the present invention is to provide a novel combination of pneumatic mount systems for fixed or mobile equipment that is capable of providing proper load support and also efficient vibration and shock isolation.

Another object is to provide a novel combination of pneumatic mount systems that provides high isolation efficiency with respect to low frequency high amplitude vibrations such as are caused by an earthquake or mechanical shock and also higher frequency lower amplitude vibrations such as are caused by operation of machines.

Further objects of the invention are to provide pneumatic mounts of the character described that have relatively wide load ranges and have a relatively large damping effect on shock and vibration.

The foregoing and other objects disclosed or rendered obvious by the following description are achieved by means of two cooperative air mount systems each consisting of one or more air springs. One system serves as a load support while the other serves as a vibration and shock damper or isolator. Each spring in each system has a bellows communicating with an attached air tank.

Other features and advantages of the present invention are disclosed or rendered obvious by the following specification and the corresponding drawings wherein.

In the drawings, identical parts are referred to by the same numbers.

Figure 1:
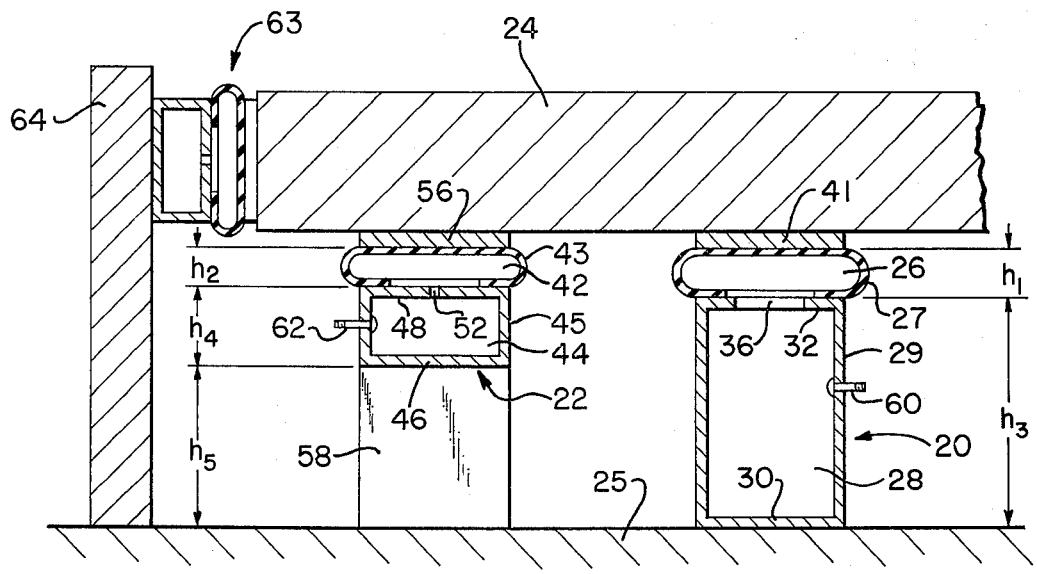
FIG. 1 is a sectional view in elevation of a pneumatic mount assembly provided according to this invention.

Referring now to FIG. 1 of the drawings, the illustrated mount assembly comprises first and second pneumatic spring systems consisting of air mounts or springs 20 and 22 respectively, disposed in parallel and adjacent to one another between an equipment supporting base 24 and a load support 25 which may be a floor, deck, platform, foundation, etc. It is to be appreciated that the mounting base 24 may form part of an equipment or apparatus to be supported or may be a separate base on which the equipment or apparatus to be supported is mounted. Also, although in some applications it may suffice to support the mounting base 24 with only one mount assembly, in the usual case each pneumatic spring system consists of more than one air spring and the base is supported at a minimum of three spaced points so as to facilitate balancing the base and holding the supported equipment level.

The air mount 20 has a greater air capacity than air mount 22 and functions primarily as the load support. Accordingly, air mount 20 is hereinafter described as the "main air mount" while air mount 22 is hereinafter referred to as the "auxiliary air mount."

The main pneumatic mount 20 comprises an upper air chamber 26 defined by a bellows 27 formed of a resilient elastically deformable material such as a natural or synthetic rubber, and a lower air chamber 28 defined by a substantially rigid container or tank 29 preferably made of steel or other metal or metal alloy. As used herein, the term "substantially rigid" is intended to denote that the walls of the container are substantially inflexible under the operating pressures in chamber 28. The container 29 is typically in the form of a right cylinder having substantially flat bottom and top walls 30 and 32. The bellows 27 is attached at its bottom end to top wall 32 of container 29 and at its upper end to a mounting plate 41, so that the bellows, container and mounting plate form a unitary sealed structure. Bellows 27 is attached to container 29 and mounting plate 41 by means well known in the art, e.g., by chemical bonding with an adhesive such as an epoxy resin or by mechanical means. The upper wall 32 of container 29 is formed with an opening 36 for providing communication between upper chamber 26 and lower chamber 28. Opening 36 is relatively large so as to provide little or substantially no resistance to air flow between the two chambers. By way of example, opening 36 may comprise 50% or more of the area of top wall 32. The tank 29 may be secured to load support 25 by suitable means such as by chemical bonding or by rivets or other mechanical fastening means. In this connection it is to be noted that the bottom end of tank 29 may be provided with a peripheral flange or mounting plate whereby it can be fastened to load support 25.

The auxiliary pneumatic mount 22 comprises an upper air chamber 42 defined by a bellows 43 formed of a resilient elastically deformable material such as a natural or synthetic rubber, and a lower air chamber 44 defined by a substantially rigid container or tank 45 preferably made of steel or other metal or metal alloy. Tank 45 is typically in the form of a right cylinder having a substantially flat bottom and top walls 46 and 48. Bellows 43 is attached at its bottom end to top wall 48 of container 45 and at its upper end to a mounting plate 56 in the same manner as bellows 27 is attached to top wall 32 and mounting plate 41, so that the bellows, container and mounting plate form a unitary sealed structure. The upper wall 48 of tank 45 is formed with an opening 52 for providing communication between the upper and lower chambers 42 and 44 respectively. Opening 52 is relatively small so as to function as an orifice.

The upper and lower air chambers 26 and 28 of main pneumatic mount 20 have greater volumes than the counterpart upper and lower air chambers 42 and 44 respectively of auxiliary mount 22. The two bellows 27 and 43 may but need not have substantially identical diameters as measured at their widest points. Also, it is advantageous that chamber 26 have a greater height $h_1$ than the chamber 42 height $h_2$. The lower chamber 28 and lower chamber 44 may but need not have substantially identical diameters. However, the lower chambers 28 and 44 should also comprise greater volumes than their respective upper chambers 26 and 42. Since chamber 28 has a greater volume than chamber 44, its height $h_3$ is greater than the height $h_4$ of chamber 44. Because its height is small compared to that of container 29, container 45 is secured to load support 25 by one or more spacer shims or blocks 58 of height $h_5$ which are arranged so that the overall height (or length) of auxiliary mount 22 and spacer 58 ($h_2 + h_4 + h_5$) is substantially identical to the overall height ($h_1 + h_3$) of main mount 20.

Finally, the main and auxiliary mounts 20 and 22 respectively may be fitted with valve means indicated generally at 60 and 62 so that air or a gas may be injected into or removed from the respective chambers to adjust the pressure therein as desired. Valve means 60 and 62 may take the form of conventional automobile tire valves, or the valve means may be automatic pressure control valves of conventional design. It is contemplated also that if each of the two cooperative springs systems consist of more than one air mount, the main mounts which make up one of the two spring systems may be individually attached to automatic pressure control valves and the auxiliary mounts which make up the other spring system may be connected to a common air regulator.

Main pneumatic mount 20 commonly is pressurized so that the applied static load of the equipment is substantially balanced off without any spring deflection, i.e., so that the bellows 27 is substantially undeflected and the height of chamber 26 ($h_1$) is the same as it is when the main mount is unloaded and its internal air pressure equals the external air pressure. This load-balanced condition is called the "nominal loading" condition.

The auxiliary pneumatic mount 22 is pressurized to a fraction of the pressure in the main air mount 20 and preferably just enough to keep it from sagging, so that its stiffness is much less than that of the main air mount 20. In practice, the pressure in the auxiliary air mount 22 is preferably kept in the range of about 0.1 to about 1.0 kg/cm² (gauge pressure).

Accordingly, the mounting assembly shown in FIG. 1 combines two cooperative spring systems — a primary or main air mount system which acts as a load support capable of providing isolation of relatively high frequency, relatively low amplitude vibrations, and a secondary or auxiliary air mount system which serves as a vibration damper for relatively low frequency, relatively large amplitude vibrations. More particularly, under nominal loading, the load of mounting base 24 and the equipment supported on that mounting base is carried by the main air mount 20 with the bellows 27 and the supporting air column of the main air mount acting to reduce the small amplitude vibrational forces transmitted from the equipment to support structure 25 if the equipment is the source of vibrations and also to reduce the dynamic vibratory motion transmitted to the equipment from the support structure if the latter is the source of vibration. If large amplitude vibrational forces occur, e.g., due to earthquake, explosions or mechanical shock, the auxiliary air mount 22 comes into play to dampen transmission of such forces from the support structure to the equipment or vice versa, depending upon whether the support structure or the equipment is the source of such forces.

It is preferred as in the illustrated embodiment of the invention that the height $h_2$ of the bellows of the auxiliary air mount 22 be relatively small, since this increases the velocity of the air flow through the orifice 52 when the system is subjected to large amplitude shock forces, as, for example, when an earthquake occurs. The increased velocity of air flow through orifice 52 has the effect of increasing the damping effect of the auxiliary air mount.

FIG. 1 also discloses an optional feature of the invention. In the event a block or other stationary support 64 is located at one side of mounting base 24, it is contemplated to insert another auxiliary air mount 63 between the member 64 and the mounting base. Air mount 63 is the same as air mount 22 and functions to dampen large amplitude lower frequency vibrations in a horizontal direction. Lower amplitude higher frequency horizontal vibrations are isolated by the main air mount. Of course, an air mount 63 could be located at each side of mounting base 24 if desired, and more than one air mount 63 could be disposed at each side of base 24.

Figure 2:
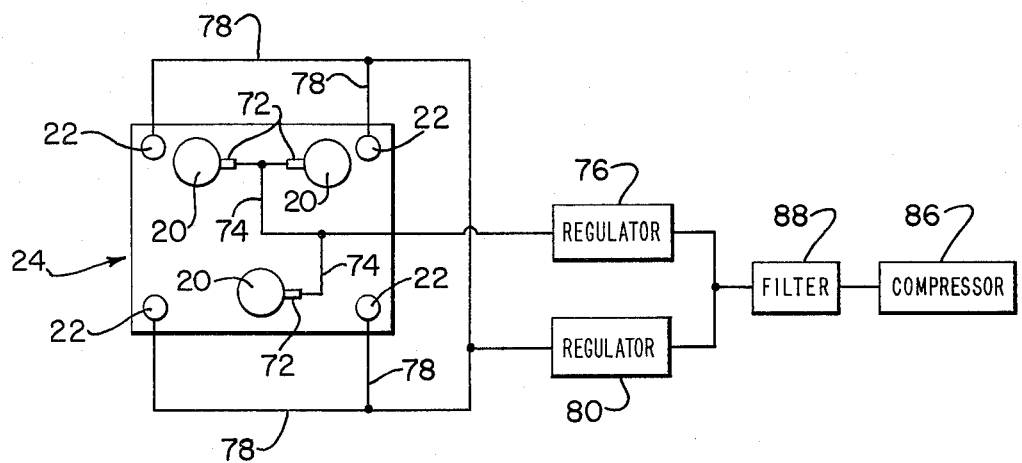
FIG. 2 is a bottom view of a pneumatic mounting arrangement constituting another and preferred embodiment of the invention.

FIG. 2 illustrates a pneumatic mounting arrangement constituting a preferred embodiment of the invention. In this connection it is to be noted that the number of air mounts in the two cooperative spring systems may be equal or unequal. Thus in FIG. 2 there are three main air mounts 20 and four auxiliary air mounts 22. The three main air mounts 20 are disposed in a triangular arrangement while the four auxiliary air mounts 22 are located in a rectangular arrangement with respect to mounting base 24.

In this preferred embodiment, the main air mounts 20 are provided with pressure control valves 72 which are connected via lines 74 to a common air regulator 76 to provide automatic pressure control. Valves 72 may be of the automatic level control variety, i.e., valves 72 may be of the type adapted to automatically adjust the air pressure in chamber 28 of air mounts 20 so as to maintain the base 24 level at a selected height. The auxiliary air mounts 22 are interconnected through lines 78 to a common air regulator 80. Air regulators 76 and 80 may take the form of conventional automatic pressure control regulators well known in the art. These regulators are connected via lines 82 and 84 to a compressed air source 86 which may be an air compressor of conventional design. Preferably the air is filtered by means of a filter 88 that is connected between the compressed air source 86 and regulators 78 and 80.

If desired, the auxiliary air mounts 22 may also have individual pressure control valves similar to the ones provided for main air mounts 20. However, such are generally not necessary due to the relatively low pressures normally present in the auxiliary air mount system, e.g., typically about 0.1 – 1.0 kg/cm² (gauge pressure).

The effect of using the auxiliary air mount system in combination with the main air mount system will now be described with reference to FIG. 3. First of all, if the bellows 27 is used by itself, i.e., if it is pressurized with air but sealed off so that it cannot communicate with chamber 28, its spring stiffness $R$ is determined by the following equation:

$$R = \frac{\delta P_o A_o^2}{V_o} + \frac{(P_o - P_a)}{D_o} \cdot A_o \cdot \pi$$

where:
$P_o$ is the air mount internal pressure (absolute);
$P_a$ is the atmospheric pressure;
$\delta$ is the polytropic index;

$A_o$ is the effective load carrying area of the air mount;

$D_o$ is the diameter of the effective load carrying area of the air mount; and $V_o$ is the total volume of the air mount As is well known in the art, if now the bellows 27 is connected to air chamber 28 via the large opening 36, the total volume Vo becomes larger and hence the stiffness R will decrease to provide a soft spring action. Thus the main air mount system will have improved isolation efficiency with respect to low amplitude higher frequency vibrations. However, its isolation efficiency will be relatively poor for low frequency high amplitude vibrations as are produced by earthquake shock. Some improvement in isolation efficiency for lower frequency vibrations can be achieved if the bellows chamber 26 is connected to tank chamber 28 via a small orifice like opening 52 instead of by the large opening 36. However, this has the effect or reducing the isolation efficiency for high frequency vibrations. Some improvement of isolation efficiency for higher frequency vibrations can be achieved by increasing the size of bellows 27 and tank 29, but the improvement is not enough to justify the increased size of the air mount. Also increasing the size of the air mount increases its cost.

Figure 3:
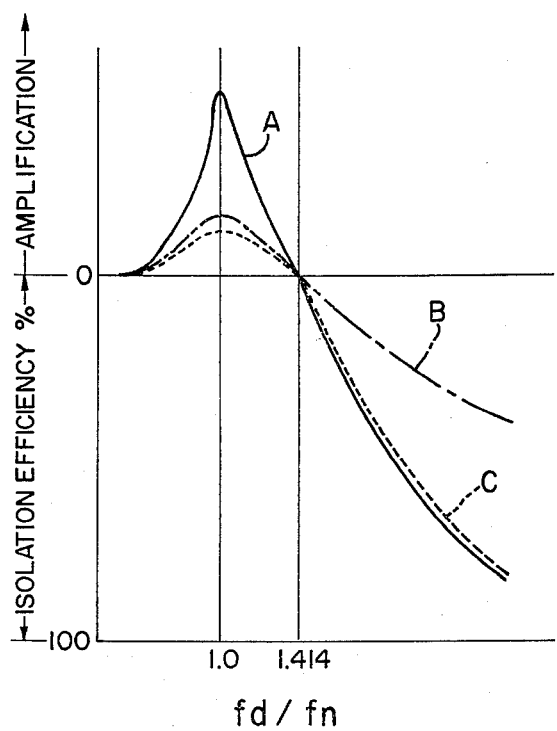
FIG. 3 is a plot of isolation efficiency vs. the ratio of forcing frequency to natural frequency.

The isolation efficiency of the main air mount system when bellows 27 is connected to air tank 29 via large opening 36 is shown by curve A of FIG. 3, while curve B shows how its isolation efficiency is modified if opening 36 were replaced by a small orifice. Curve A corresponds to that of an undamped coil spring while curve B corresponds to that of a damped coil spring. What happens when the system of auxiliary air mounts 22 with the small orifice 52 are added to the system of main air mounts 20 having the large opening 36 is shown by curve C. As can be seen, curve C has a lower amplification peak than curves A and B. Moreover, the isolation efficiency for the combined air mount systems is much greater than that of the main air mount system alone with respect to higher frequencies and in fact is almost identical with that obtained using only the main air mount system where the main air mounts have a small orifice rather than a large opening connecting bellows 27 and tank 29. In FIG. 3, the term "fd" denotes forcing frequency and the term "fn" denotes natural frequency. The forcing frequency is the oscillatory input while the natural frequency is the rate of oscillations the isolator would experience if displaced from equilibrium and allowed to vibrate freely.

Obviously, other modifications of the invention will be obvious to persons skilled in the art from the foregoing features.

What is claimed is:

1. In combination with a load mounting base, at least one pneumatic assembly for dynamically supporting said base, said assembly comprising:

a first pneumatic spring system for supporting said load mounting base and providing isolation of relatively high frequency and relatively low amplitude vibrations, said first spring system comprising an air spring having a bellows and a tank with said bellows and tank being filled with a fluid under pressure and being connected by a relatively large opening so that fluid can flow relatively unobstructed from said bellows to said tank and vice versa;

a second pneumatic spring system for damping relatively low frequency, relatively large amplitude vibrations, said second spring system being disposed in parallel to said first spring system and comprising an air spring having a bellows and a tank with said bellows and tank being filled with a fluid and being connected by a relatively small orifice whereby flow of fluid from said bellows to said tank and vice versa is restricted by said orifice, the stiffness of said second spring system being substantially less than the stiffness of said first spring system.

2. Apparatus according to claim 1 wherein the air spring of said first spring system has a substantially greater fluid volume than the air spring of said second spring system.

3. Apparatus according to claim 1 wherein the fluid in said second spring system is under a pressure that is low in relation to the pressure of the fluid in said first spring system.

4. Apparatus according to claim 1 wherein said spring systems include means for injecting fluid into and withdrawing fluid from said springs, and means for regulating the fluid pressure.

5. Apparatus according to claim 1 wherein said first and second systems each comprise a plurality of springs as previously described, and further including (a) valve means for controlling the pressures in the tanks of the springs of said first system, and (b) a common pressure regulator connected to the tanks of the springs of said second system.

6. Apparatus according to claim 5 wherein said valve means are connected to a second pressure regulator, and both regulators are connected to a source of compressed fluid.

7. Apparatus according to claim 5 wherein the number of springs in said first and second systems are equal.

8. Apparatus according to claim 5 wherein the number of springs in said first and second systems are unequal.

9. Apparatus according to claim 1 wherein substantially all of the load of said load mounting base is carried by said first spring.

10. A pneumatic spring assembly comprising:

a first substantially rigid tank defining an interior space;

a first bellows made of an elastically deformable material connected to said first tank so as to provide relatively unconstricted fluid communication between said first tank and said first bellows;

a second substantially rigid tank defining an interior space;

a second bellows made of an elastically deformable material connected to said second tank so as to provide relatively constricted fluid communication between said second tank and said second bellows;

said first tank and bellows and said second tank and bellows, respectively, being disposed in parallel with respect to a common mounting base and having internal fluid pressures such that substantially all of a compressive load applied normal to said base is carried by said first bellows and tank and the fluid therein and said second bellows and tank and the fluid therein coact to dampen vibrational movement of said load due to a shock load.

11. A pneumatic spring assembly according to claim 10 wherein said first tank and bellows have a substantially greater fluid volume and a substantially greater internal fluid pressure than said second tank and second bellows.

12. In combination with a load mounting base, a primary spring system for supporting said load mounting base and a secondary spring system disposed in parallel with said primary spring system, for damping selected vibrations of said base, said primary spring system comprising a plurality of primary air springs each having a bellows and a tank, with said bellows and tank containing a fluid under pressure and being connected by a relatively large opening so that said fluid can flow relatively unobstructed from said bellows to said tank and vice versa; and said secondary spring system comprisng a plurality of secondary air springs each having a bellows and a tank, with said bellows and said tank containing a fluid under pressure and being connected by a relatively small orifice whereby flow of fluid from said bellows to said tank and vice versa is restricted by said orifice.

13. The apparatus combination of claim 12 wherein said each of said primary air springs has a substantially greater fluid volume than each of said secondary air springs.

14. The apparatus combination of claim 12 wherein the fluid in each of said secondary air springs is at a substantially lower pressure than the pressure of the fluid in each of said primary air springs.

15. In combination with a load mounting base, at least one pneumatic assembly for dynamically supporting said base, said assembly comprising:

a first pneumatic spring system comprising an air spring having a bellows and a tank with said bellows and tank being filled with a fluid under pressure and being connected by a relatively large opening so that fluid can flow relatively unobstructed from said bellows to said tank and vice versa;

a second pneumatic spring system mounted in parallel with said first spring system relative to said load mounting base, said second spring system comprising an air spring having a bellows and a tank with said bellows and tank being filled with a fluid and being connected by a relatively small orifice whereby flow of fluid from said bellows to said tank and vice versa is restricted by said orifice; said second pneumatic spring system having a substantially smaller fluid volume that said first pneumatic spring system, and the fluid in said second pneumatic spring system being under a pressure that is low in relation to the pressure of the fluid of said first pneumatic spring system.

* * * * *